June 17, 1930.   G. F. MACHLET   1,763,666
REGULATING DEVICE
Filed Jan. 21, 1927   2 Sheets-Sheet 1

Inventor
George F. Machlet
By B.C. Stickney
his Attorney

June 17, 1930.  G. F. MACHLET  1,763,666
REGULATING DEVICE
Filed Jan. 21, 1927    2 Sheets-Sheet 2

Inventor
George F Machlet
By B. C. Stickney
his Attorney

Patented June 17, 1930

1,763,666

UNITED STATES PATENT OFFICE

GEORGE F. MACHLET, OF ELIZABETH, NEW JERSEY

REGULATING DEVICE

Application filed January 21, 1927. Serial No. 162,589.

This invention relates to regulating means for sensitively maintaining a uniform working condition in any apparatus or system that depends upon the application of some operating medium or agency to said apparatus or system for the establishment of said condition. It is presupposed that variations for said condition or the progress of its establishment may be translated into some mechanical effect, as, for example, the movement of an indicator to or from a position which registers the condition to be maintained. The invention is herein illustrated as embodied in means for maintaining a predetermined temperature in a furnace. In one form of such embodiment of the invention herein shown where the furnace is supplied with combustible fuel, a valve, whereby the supply of fuel is controlled, is automatically regulated by means of the invention. In another embodiment of the invention, also herein shown, it is a rheostat for controlling the current supplied to an electric furnace, that is automatically regulated by means of the invention.

In my Patent 1,306,015, dated June 10, 1919, there is shown applied to a furnace, a heat regulating device that responds to a variation in pneumatic pressure, said pressure being controlled by the usual shifting indicator, which, by its position, indicates the degree of heat in a furnace. According to this patent, a manometric pressure system which may actuate a fuel valve has a relief outlet so disposed that it may be covered and uncovered by a strip that shifts with the shifting indicator, so that, when the indicator reaches a particular position corresponding to a predetermined degree of heat, the strip will have been moved sufficiently to have uncovered the relief opening. The ensuing dissipation of the pressure in the manometric system due to the uncovered relief outlet causes a diaphragm, which is part of said system, to partly or wholly collapse, and thereby, in order to prevent an increase in heat beyond the predetermined degree, regulate a fuel valve which is connected to said diaphragm. When the heat in the furnace falls below the predetermined degree, the indicator will recede from the position corresponding to said degree and thereby cause the relief outlet to be closed again. The pressure in the manometric system consequently rises again and expands the diaphragm, thereby causing the fuel valve to be regulated for an increase in heat. The pressure in the manometric system is produced by compressed air, which is admitted into the system by means of an adjustable valve. The relief outlet is made small, so that it may be controlled by the indicator, without imposing upon the indicator a burden which would impair its operation. The inlet to the manometric system afforded by said adjustable valve and through which compressed air is supplied is correspondingly small. Due to said small inlet and outlet it results that the regulation although generally satisfactory may for some special purposes be somewhat too sluggish.

An object of the present invention is to provide a manometric pressure system that will afford prompt yet sensitive regulation of a fuel supply, or the like. Such a system has necessarily a large inlet, and a correspondingly large relief outlet, and such large outlet is to be quickly opened and closed. This large relief outlet is, according to the present invention, not directly controlled by the indicator, but is controlled by means of what may be called a relay manometric system, which operates a valve for quickly opening and closing the large relief outlet of the main manometric system.

The relay manometric system may have a small inlet and a correspondingly small relief outlet that is easily controlled by the indicator. The proportions of the relay manometric system diaphragm may be such that is responds quickly and surely to the opening and closing of the small relief outlet.

A further object of the invention is to provide improved means whereby the relief outlet of the relay manometric system may be opened and closed in response to the movements of the indicator in such a way that practically no burden is put upon said indicator to impair its operation. To this end a closure for the relief outlet is made in the form of a pivoted flap, having a face which may abut said outlet to close it. The flap is so pivoted that an adjustable counterweight, or its equivalent thereon, may just overbalance the pressure in the relay manometric system, and thereby keep the relief outlet closed. It is evident that due to the delicately balanced closure very little effort is required of the indicator to open it.

The relief outlet of the relay manometric system is in the form of a vent at the end of a tube that is flexibly connected to the body of said relay manometric system. By reason of said flexible connection the vent and its closure are movable, and means may be provided for easily shifting and guiding the vent and closure along the range of movement of the indicator. The indicator may thus encounter the closure, and coact therewith at any predetermined position along said range, to the end that the degree of heat to be maintained may be set.

The valve which controls the large relief outlet of the main manometric system, and which is operated by the diaphragm of the relay manometric system, may be of such proportions and design that quick opening or closing of the main relief outlet may be had.

Pressure in both the main and relay manometric systems is preferably established by means of compressed air, although it is conceivable than means other than compressed air may be used for establishing such pressure, as, for example, a liquid, a liquid vapor, or some gas other than air.

The valve for admitting the pressure-establishing medium into the main manometric system is of such proportions as to afford an inlet of an area that is in accord with the purpose of the large relief outlet contemplated by the invention for said main manometric system.

It will be understood that the use of the invention is not restricted to the regulation of heat in a furnace. The invention may be used to regulate any condition which may be registered by the movement of an indicator, or similar device, and which condition may be adjusted by controlling an operating medium or agency that affects said condition. Thus, for example, the potential of an electric power system may by means of the invention be sensitively maintained at a predetermined value; or a standard of hydraulic pressure may be sensitively maintained, etc.

It will be further understood that the use of a relay manometric system in conjunction with a main manometric system is not restricted to the quick opening or closing of a fuel supply valve or the like. Numerous variations in the regulating properties of a relay and main system may be had, by devising the means operated by the diaphragms in accordance with the regulating characteristics desired.

Other features and advantages will hereinafter appear.

In the accompanying drawings.

Figure 1:
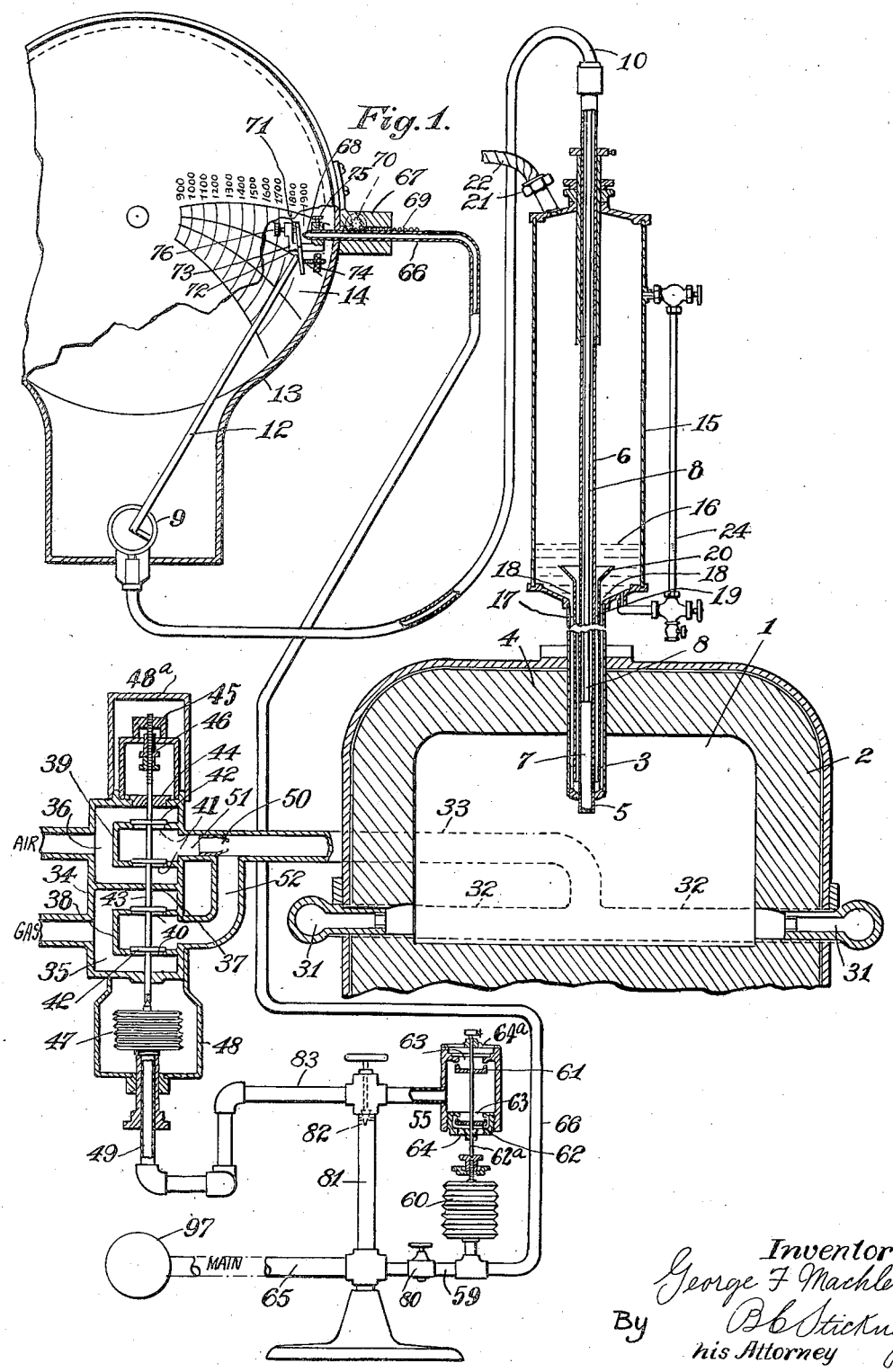
Figure 1 is a diagrammatic, sectional elevation showing the application of the invention for regulating the heat of a gas furnace. A vapor-pressure or pneumatic thermometer for registering the degree of heat, and the manometric devices of the invention are shown diagrammatically in cooperative relation.

Into the flame-chamber 1 of a furnace 2 projects a sheath 3, forming part of a thermotic device of the type shown in my aforesaid Patent No. 1,306,015, said sheath preferably extending down through the top 4 of the furnace. At its lower end said sheath terminates in a nipple 5 of copper, nickel or other suitable metal which may be exposed to the flames of the furnace. This nipple 5 may merge into a long tube 6 supported centrally within the sheath, and inserted in said tube is a bulb 7 of a recording thermometer, which may depend for its operation upon the pressure of the vapor of a liquid in the bulb 7, which, by means of the nipple 5, is exposed to the temperature to be recorded. At its upper end the bulb merges with a hollow stem or pipe 8, which, by means of a flexible tube 10, is connected to the casing 9 which contains the mechanism for turning the needle or indicator 12 of the thermometer 13, which may have a record disk 14.

The sheath 3 serves as a water or liquid jacket for the lower portion of the tube 6 containing the thermotic device; and at its upper end may open into an enlargement or flask 15, partly filled with water 16, so that the thermotic tube 6 is surrounded by a water jacket from the nipple 5 up to a point within the flask 15; the sheath 3 between the nipple 5 and the flask being long enough, so as to gain sufficient advantage from the use of water or other heat-absorbing liquid having a substantially stable boiling point. The use of said liquid is for the double purpose of cooling the nipple 5 and thermotic tube 6 and establishing a practically stable standard or normal temperature, to insure that fluctuations in the actual heat of the nipple 5 and tube 6 shall be proportionate to the fluctuations in the actual heat of the furnace; such standard or normal temperature being far below the temperature to which the sheath is actually exposed.

The well formed by the sheath 3 is divided by an interior tubular portion 17 into outer upflow channel 18 and inner downflow channel 19, thus securing good circulation of the water, and insuring that the coolest portion of the water in the tube shall flow directly upon the thermotic tube 6. At its upper end the partition-tube 17 may terminate within the flask in a flaring or funnel-like mouth 20, of such proportions as to gather a large proportion of the cooling water settling in the flask. A connection 21 and pipe 22 at the top of the flask 15 may lead to a suitable condenser (not shown), for the vapor formed in the flask 15. A gage 24 at the side of the flask may indicate the amount of water in the flask.

The furnace flames may be produced by burners 31, connected to fuel feed pipes 32, receiving the fuel from a supply pipe 33. This pipe 33 connects with a gas and air mixing apparatus of the type shown in my aforesaid patent. Said mixing apparatus includes a chest 34 having separate gas and air chambers 35, 36, into which said chest is divided by a partition 37. The gas chamber contains an outlet box 38, and the air chamber contains an outlet box 39. The gas outlet box has opposite upper and lower ports 40, and the air outlet box has similar ports 41. All four ports are in line. There are four valves 42, one for each port, all valves fixed upon a single vertical stem 43, guided partly in partition 37, partly in a bushing 44 in the top of the chest, and partly in the bottom wall of the chest. All four ports are closed simultaneously or opened simultaneously. An adjustable stop 45 may be provided for limiting the closing movement, so that the supply of the fuel to the furnace shall not be reduced below a certain minimum, which may be set at any desired point. The lift of the valves may also be regulated by an adjustable stop 46.

For automatically opening and closing the fuel ports 40 and 41, a main manometric-pressure device controlled by a relay manometric-pressure device, which in turn is controlled by the thermometer, is provided. The main manometric-pressure device includes a flexible diaphragm 47, which is connected to the lower end of the fuel-valve stem 43. Thus expansion and contraction of said diaphragm 47 may open and close the ports 40 and 41 by means of the valves 42. In order to prevent escape of fuel through the fuel-valve stem bearing that is in the lower wall of the chest 34, the diaphragm is enclosed in an air-tight chamber 48. Through its bottom there is inserted into said chamber a pipe 49, through which the pressure-effecting medium, preferably compressed air, is conveyed to the diaphragm 47. The upper end of said pipe 49 is connected to the lower surface of said diaphragm 47, said lower surface having an opening from said pipe 49. An air-tight chamber 48ª prevents escape of fuel by way of the valve-stem bearing in the bushing 44. The compressed air for inflating the diaphragm 47 may be supplied from a main 65, which communicates with the pipe 49 by means of a branch formed by a pipe 81 and a pipe 83.

Figure 3:
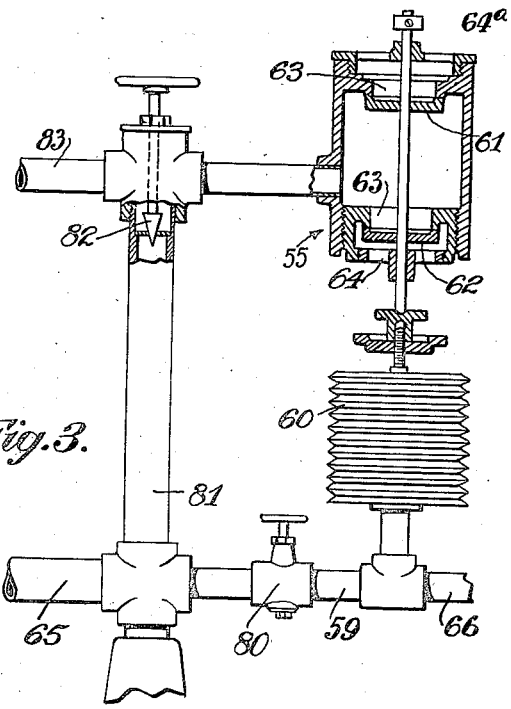
Figure 3 is an enlarged view of the main vent and the valves and valve-chamber therefor. Said main vent is shown as being closed.

In order that the fuel-ports 40 and 41 may be opened and closed in accordance with fluctuations of heat in the furnace, means are provided to vary the pressure on the diaphragm 47 in accordance with said fluctuations. There is provided, therefore, a relief outlet for said pressure, said relief outlet, as shown in Figure 1, being located at the end of an extension of the pipe 83. In order that said relief outlet may be opened and closed in accordance with said fluctuations, said outlet is in the form of ports 63 formed in a chest 55 and controlled by valves 61 and 62. One reason for making the relief outlet in the form of two ports in the chest 55 is that the pressure on the valves for opening and closing said ports may be balanced. It is evident that such balance is obtained by the construction shown in Figure 3, and that said balance is effected as said pressure tends to close the upper port 63 by means of the valve 61 while at the same time tending to open the lower port 63 by means of the valve 62. The ports 63, when open, may communicate with the atmosphere by means of openings 64 and 64ª in the lower and upper walls respectively of the chest 55.

It is evident that the pressure on the diaphragm 47 will vary in accordance with the opening and closing of the ports 63, which form the relief outlet for said pressure. To control the opening and closing of said ports 63 by means of the valves 61 and 62, there is provided a relay manometric device, the active part of which is what may be called a relay diaphragm 60. Said relay diaphragm 60 may actuate the valves 61 and 62 by means of a valve-stem 62ª, to which said valves are fixed, the lower end of said stem being attached to the upper surface of said relay diaphragm 60.

Compressed air for inflating the relay diaphragm 60 is introduced therein through piping 59 connected to the main 65. The opening and closing of the ports 63 is controlled by varying the pressure on the relay diaphragm 60, and there is accordingly provided a relief outlet from the piping 59. In accordance with the purpose of the invention, the latter relief outlet, which may be called a pilot-vent, is, by means of fluctuations of the thermometer-indicator 12, directly controlled by the fluctuations of the heat in the furnace-chamber 1. As shown in Figure 1, such pilot-vent 68 is located within the main casing of the thermometer 13, so that a closure 71 for said pilot-vent may be controlled by the indicator 12 of said thermometer. The pilot-vent is formed by a contraction of the end of a tube 66, which, as shown in said Figure 1, is an extension of the piping 59 through which the relay diaphragm 60 is inflated.

Figure 2:
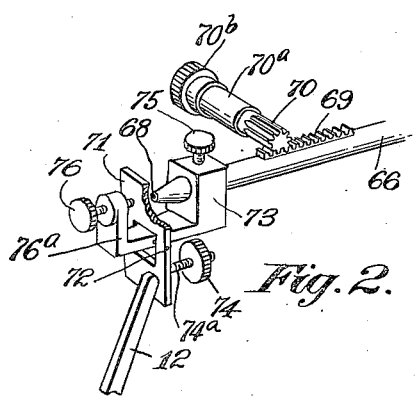
Figure 2 is a perspective view of the vent of the relay manometric device and the closure therefor, the latter being shown as displaced by the indicator to open said vent. Details of the closure mounting and means for shifting the vent and closure are shown in this view.

In order that the closure 71 may be actuated by the indicator 12 without imposing upon said indicator a burden that would impair its operation, it is made, as best shown in Figure 2. Said closure, in the form of a flap, is pivoted upon pivots 72 extending from opposite sides of a bracket 73 that may, by means of thumb-screw 75, be adjustably clamped to the pilot-vent tube 66. By means of the adjustability of said bracket 73, the closure surface of the flap may be made to truly cover the orifice of the pilot-vent or leak 68. It is evident that any pressure within the tube 66 will react, at the pilot-vent 68, against the closure 71 and thus tend to open said vent. An adjustable counterweight 74 is therefore provided and attached to the closure 71 in such a way that the pressure tending to displace said closure may be balanced thereby. As shown in Figure 2 the counterweight may be in the form of a sufficiently heavy nut threaded upon a stud 74ª projecting from the surface of the flap that forms the closure. By means of said stud 74ª the counterweight may be adjusted toward or away from the closure pivot 72 and thus its balancing effect may be varied. The bracket 73 upon which the closure is pivoted may have an adjustable stop in the form of a screw 76 threaded into a lug 76ª which forms part of said bracket, the purpose of said stop being to limit the displacement of the closure 71. As shown in Figure 1 the closure may be displaced to open the pilot vent by a delicate touch of the end of the indicator 12 upon or against said closure. In accordance with the purpose of the invention it is intended that the indicator shall thus open said closure when said indicator registers a predetermined degree of heat in the furnace, and shall do so with such a light touch as not to impair its efficiency as a member of the delicate heat-indicating apparatus. The indicator 12 thus coacts lightly with the closure only at said predetermined degree of heat, and for any indications of heat substantially below said degree the indicator is not in contact with the closure. In such case, by reason of the counterweight 74, the pilot vent 68 is kept closed, the pressure in the leak tube 66 being kept sufficiently low by the adjustment of valve 80. A fine and quick regulation of only a few degrees may be obtained even when the heat is thousands of degrees, which was not found practicable in the apparatus disclosed in my said patent.

In order that the degree of heat at which the indicator 12 and the closure 71 will coact may be set, provision is made to move the pilot vent and its closure along the range which the end of the indicator traverses. To this end the tube 66 which supports the closure-supporting bracket 73, and at the end of which the pilot vent is formed, is slidably retained in a bearing 67. Said bearing 67 as shown in Figure 1 may be attached to the main casing of the thermometer and its disposition is such that the direction in which the pilot vent and its closure are shifted is substantially along the range of movement of the end of the indicator 12.

For readily shifting the tube 66 with its pilot vent and closure there may be provided on said tube a rack 69 which may co-operate with a pinion 70 formed on the end of a stud 70ª that includes a finger-knob 70ᵇ, said stud being journaled in the bearing 67 in which the tube 66 slides. The tube 66 may, as shown in Figure 1, be of a form to afford sufficient flexibility to permit the movement of the pilot vent portion of said tube within the bearing 67, it being understood that said portion in order to support the rack 69 is preferably made of metal. Clamping means (not shown) may be provided to secure the tube 66 in any adjustable position. For controlling the air supply to the diaphragm 47 there is provided a needle valve 82. The air supply to the relay diaphragm 60 is similarly controlled by a valve 80, said valves 80 and 82 being preferably of the needle type.

The operation of the manometric train and its related parts in regulating the heat in the furnace chamber may be described as follows: When the indicator 12 has reached, as shown in Figure 1, the maximum heat position represented by the position of the closure 71 in the range of indicator movement said closure will have been displaced, so that air may freely escape from the pilot vent 68. Normally the leakage from said valve may be slight at all times, thus avoiding high pressure in tube 66, it not being desired to keep the valve normally wide open, as would be the case if the air in tube 66 were constantly under high pressure. As a result of such free escape of air through the pilot vent, so effected by the opening of the valve by the touch of the needle, there will be a quick reduction of the weak pressure under the relay diaphragm 60, which thereby collapses, and opens the ports 63, which constitute the main relief outlet or vent for the main diaphragm 47. Said main vent being thus opened, the high pressure under said main diaphragm 47 is dissipated, causing it to collapse and by reason of its connection with the valves 42 to close the ports 40 and 41 of the gas and air passages respectively. By such closing or reduction of the ports 40 and 41 the fuel supply to the furnace is cut down, thus bringing about the desired reduction in the heat of the furnace. As the heat in the furnace falls below the predeterminedly fixed degree the indicator 12 will promptly recede from the position which registers said degree, whereupon the closure by reason of the counterweight 74 thereon will again close the pilot vent 68, permitting it to leak a trifle. With the recession of the indicator and the closing of the pilot vent 68 there is a recovery of the normal weak pressure on the relay diaphragm 60, which thereupon, by means of the valves 61 and 62, closes the ports 63 of the main vent. As said main vent ports 63 close there is also a recovery of the high pressure under the main diaphragm 47, causing an expansion of said diaphragm and a lifting of the supply valves 42, said valves 42 thereby again opening the fuel ports 40 and 41.

The opening which forms the pilot vent 68 is necessarily small, so that a closure therefor may be easily displaced by the indicator 12. It is to provide for a rapid dissipation and recovery of the pressure under the main diaphragm 47 that the relatively large relief outlet characterized by the ports 63 is provided, and that the valves 61 and 62 for said ports are controlled through the relay diaphragm 60. The diaphragm 60 and its connections to the tube 66 may be so proportioned that even a slight dissipation of the weak pressure on said relay diaphragm through the pilot vent 68 is sufficient to collapse said relay diaphragm enough to afford a relatively large relief outlet for the main diaphragm 47. It will be understood that the rate of dissipation and recovery of pressures upon the main and relay diaphragms are controlled by their respective valves 82 and 80.

The compressed air impressed upon the diaphragm 47 may be obtained from an air-compressor or a compressed air reservoir conventionally indicated at 97, Figure 1. If the source of air supply is apt to vary unduly, there may be provided a self-acting relief valve (not shown). The source of air supply may, if desired, be the same as that which supplies the air that is mixed with the gas for its combustion in the furnace. There may be introduced in the fuel-supply pipe 33 the usual air jet controlling nipple 50, which, as shown in Figure 1, has its orifice crosswise of the gas inlet branch 52 of said fuel-supply pipe 33.

Figure 4:
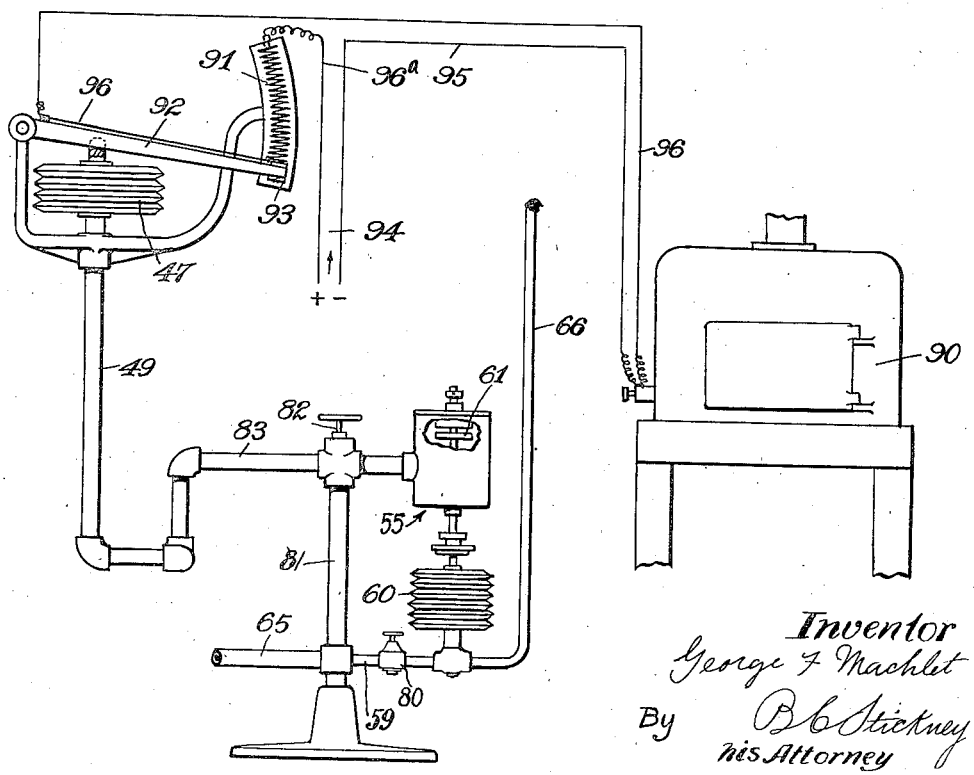
Figure 4 shows the application of the invention as a means for controlling the heat in an electric furnace. Current-controlling means, which regulate said heat, are, according to this figure, operated by means of the invention.

As an illustration of the adaptability of the invention for different purposes, there is indicated in Figure 4 an arrangement of the invention for automatically adjusting the current whereby an electric furnace is heated. In this case the main diaphragm 47 need not be enclosed, and may operate a lever 92 on the end of which is mounted a contact-block 93. Said contact-block 93, as the diaphragm 47 actuates the lever 92 on which it is supported, moves over a resistance coil 91. An elementary wiring scheme for such a device would include a lead 95 between a source 94 of current supply and the furnace 90, a lead 96 from the contact-block 93 to the furnace and a lead 96ª from the proper end of the resistance coil 91 back to the source 94 of current supply. It will be noted, according to Figure 4, that when a high heat indication of the indicator (not shown) in said Figure 4 has caused the main diaphragm 47 to collapse, there will be more resistance in the heating circuit than when the diaphragm is more extended than shown in said Figure 4, such increase in resistance causing a decrease in the furnace heating current.

In the embodiment of the invention herein illustrated, the closure for the pilot-vent is opened by the indicator of a thermometer that is operated by variations in vapor pressure in the thermotic device inserted in the furnace chamber.

The pivots 72 of the pilot vent closure or flap 71 are shown in elementary form. It will be understood that in order to minimize the work imposed upon the indicator needle 12 in operating said closure, it may be desirable to use any one of various well-known anti-friction devices for said pivots 72, for example, agate or knife-edge pivot bearings.

The thermometer casing 13 is to be suitably vented, so that the free operation of the pilot vent 68 therein is not obstructed by a trapped air space within said casing.

Variations may be resorted to within the scope of the invention, and portions of the improvements may be used without others.

Having thus described my invention, I claim:

1. The combination of a graduated dial, an indicator to co-operate with the dial, a furnace, means for automatically shifting said indicator in accordance with the fluctuations of heat in said furnace, and a pneumatic heat-regulator connected to said furnace and including a regulating vent provided with a self-closing closure in the path of said indicator, and means whereby said vent and closure may be adjusted manually as a unit to and fro in the path of the indicator and along said indicator-dial, to vary the point of regulation of the furnace, said indicator being capable of opening said closure wherever the unit is adjusted.

2. The combination with a gas furnace, of a fuel-supply valve, a high-pressure manometric system having a diaphragm connected with the fuel supply valve to open and close said valve by variations of the pressure in said system, a relief valve for said system and automatic delicately-balanced means for effecting instantaneous action of said relief valve, including a low pressure manometric system having a diaphragm for operating said relief valve, a vent for said low pressure system, a self-closing closure for said vent, and heat-indicating means connected with the furnace, and including a delicately-balanced movable indicator which in one direction of its movement may open the vent thereby relieving the pressure in the low pressure system, and consequently the pressure in the high-pressure system so that said high-pressure system will operate to close the fuel-supply valve.

3. Regulating means for controlling a fuel-supply valve for a furnace, including a manometric pressure system having pressure-reducing means, a vent on the low-pressure side and a self-closing closure therefor, a diaphragm acted upon by high pressure and controlling the fuel-supply valve, a low-pressure diaphragm controlling the high-pressure diaphragm, and means connected to the furnace whereby the heat within the furnace is registered on a heat-indicating mechanism, the indicator of which effects the opening of the low-pressure vent, said low-pressure diaphragm being controlled by said indicator through said vent.

4. In a furnace, the combination of a compound manometric pressure system having pressure-reducing means and provided with a separate low-pressure vent and a self-closing closure therefor, a fuel-supply valve controlled by high pressure in said system, and automatic delicately-balanced means for effecting instantaneous action of said pressure-reducing means, including a thermostatic device within the furnace connected with and controlling a delicately-operating indicator-needle of a heat-indicator mechanism, said indicator-needle in the advanced position thereof contacting with the closure to open the vent and thereby vary the pressure in said system to close said fuel-valve.

5. Regulating means for controlling a fuel-supply to a furnace, said means including a manometric pressure system including pressure-reducing means and having a low-pressure vent and a self-closing closure therefor, a diaphragm acted upon by the high pressure, and controlling the fuel-supply, a second diaphragm, means whereby the second diaphragm may operate under low pressure and control said high-pressure diaphragm, and means connected to the furnace whereby the heat within the furnace is registered on a heat-indicating mechanism, the indicator of which upon reaching its most advanced position opens the vent, to lower the pressure on said low-pressure diaphragm, causing it to actuate the means whereby said high-pressure diaphragm is controlled, to the end that the heat in the furnace is lowered, the indicator by means of its reverse movement permitting said self-closing closure to close.

6. A furnace regulator including a thermotic device within the furnace connected with indicator-mechanism having a delicate indicator, a manometric pressure system, a low-pressure supply line for a part of said system, said line having a leak, a substantially balanced closure for said leak controlled by a light touch of said indicator, a high pressure supply line for another part of said system and also having a relief outlet, means whereby the opening and closing of the first-mentioned leak controls the second outlet to open and close the same, a fuel-supply regulating valve, and means whereby the opening or closing of the second outlet causes said other part of said system to control the fuel-supply valve.

7. The combination with a gas-furnace, of a fuel-supply valve, a manometric pressure system having a pressure-reducing device and a main vent, an auxiliary valve for opening and closing said vent, a high-pressure diaphragm in said system connected to operate said fuel-supply valve and controlled by said main vent, a low-pressure diaphragm for controlling said main vent-valve, a thermostatic device within the furnace and connected with an indicator-mechanism, having a shiftable indicator, a low-pressure pilot-vent in said system for controlling said low-pressure diaphragm, and a self-closing closure for said pilot-vent, said closure being actuated by the indicator on an extreme high heat indication to open the pilot-vent, thereby relieving the pressure on the low-pressure diaphragm, to open the main vent-valve and dissipate the pressure on the high-pressure diaphragm and close the fuel-supply valve until the indicator recedes from the high heat indication, and permits the pilot-vent to close again, which in turn permits the main vent to close, and the fuel-supply valve to open again.

8. In a regulating mechanism for a furnace, the combination of a manometric high and low pressure system including a pipe-line having a branch leading to a high-pressure diaphragm in the system, said diaphragm controlling furnace-heating means, a low-pressure diaphragm, a main vent in the high-pressure system for varying the pressure on said high-pressure diaphragm, means enabling the low-pressure diaphragm to open and close said main vent, a low-pressure branch in said system leading to a pilot-vent for controlling the pressure on the low-pressure diaphragm, a closure for said pilot-vent, and means actuated by a thermostatic device within the furnace for operating said closure.

9. In a regulating mechanism for a furnace, the combination of a manometric high and low pressure system including a pipe-line having a branch leading to a high-pressure diaphragm in the system, said diaphragm controlling furnace-heating means, a low-pressure diaphragm, a main vent in the high-pressure system for varying the pressure on said high-pressure diaphragm, means enabling the low-pressure diaphragm to open and close said main vent, a low-pressure branch in said system leading to a pilot-vent for controlling the pressure on the low-pressure diaphragm, a closure for said pilot-vent, means actuated by a thermostatic device within the furnace for operating said closure, and manually-adjustable valves located in said branches to regulate the flow of the pressure-effecting medium in each branch and thereby hasten or retard the action on the diaphragm to which said branch is directed.

10. The combination with a gas furnace, of a manometric pressure system for controlling heating means, a thermostatic device within the furnace connected to indicator-mechanism having a shiftable indicator, and a pivoted vent for the pressure system, and a pivoted closure for said vent, weighted to be self-closing, said vent and closure mounted for adjustment as a unit along the path of said indicator, and said indicator being capable of moving said closure to open said vent, at any adjustment of the closure and vent unit.

11. The combination with a gas furnace, of a manometric high and low pressure system for controlling heating means, a thermostatic device within the furnace connected to indicator-mechanism having a shiftable indicator, a vent for the low-pressure system, a pivoted closure for said vent, weighted to be self-closing, said closure being opened by the indicator and the pressure against the closure, and means controlled through said closure for operating the high-pressure heat-controlling means.

12. The combination with a gas furnace, of a manometric high and low pressure system, said high-pressure system having a valve for controlling heating means, a thermostatic device within the furnace connected to indicator-mechanism having an indicator operated thereby, a pilot vent for steadily dissipating pressure of the low-pressure system, a pivoted closure therefor, weighted to be self-closing, and opened by the indicator, said opening and closing affecting the pressure in the low-pressure system to automatically open and close the low-pressure dissipating device and thereby operate said heat-controlling valve.

13. The combination with a gas furnace, of a manometric high and low pressure system, said high-pressure system having a valve for controlling heating means, a thermostatic device within the furnace connected to indicator-mechanism having an indicator operated thereby, a pilot vent for the low-pressure system, and a pivoted closure therefor, weighted to be self-closing, and opened by the indicator, said opening and closing affecting the pressure in the low-pressure system to automatically open and close the pilot vent to dissipate the pressure in the low-pressure system, and a diaphragm controlled by the low-pressure system for controlling a fuel-supply valve.

14. The combination with a gas furnace, of regulating mechanism therefor, including a manometric high and low pressure system, a thermostatic device in the furnace connected with an indicator-mechanism having an indicator actuated by the heat changes within the furnace, a fuel-supply-controlling valve connected to a diaphragm of said high-pressure system, a main relief outlet controlling said diaphragm, a valve for opening and closing said main relief outlet, a diaphragm in said low-pressure system for controlling the latter valve, a second relief outlet in the low-pressure system for controlling the second diaphragm and located at the indicator-mechanism, and a weighted pivoted closure for said second outlet in the path of movement of said indicator to be opened thereby in one direction of its advance movement, said closure being self-closing when the indicator recedes therefrom, the opening and closing of said second low-pressure relief outlet by means of said closure causing said fuel-supply valve to be controlled by reason of the resulting changes in pressure on said diaphragms.

15. In regulating apparatus, the combination with an indicator for registering a condition to be regulated and means actuable to adjust said condition, of a manometric high and low pressure device for actuating said condition adjusting means, said device having a normally-open main relief outlet for dissipating the pressure therein, means including a manometric low-pressure device for controlling said relief outlet, said low-pressure device having a pilot-vent, means enabling said indicator to control said pilot-vent, a source of pressure medium, connecting means from said source to said high-pressure system, and an adjustable reducing valve to regulate the flow of pressure medium to said low-pressure device.

16. In a regulating mechanism, the combination with means including a shiftable indicator for registering the condition to be regulated, of condition-adjusting means, a manometric pressure device for actuating said latter means, a pressure relief vent for said device, a closure for said vent actuable by said indicator when it reaches a predetermined position, and means whereby the vent and closure may be adjusted together along the range of indicator movement, so that said indicator may open the closure at any point in the travel of the indicator.

17. In a regulating mechanism, the combination with means including a shiftable indicator for registering the condition to be regulated, of condition-adjusting means, a manometric pressure device for actuating said latter means, a tube, including a pressure-relieving vent for said device, a closure supported by said tube and actuable by said indicator when it reaches a predetermined position, and means whereby the tube and closure may be moved along the range of indicator movement, so that the degree of condition at which said indicator and closure co-operate may be predetermined.

18. In a regulating mechanism, the combination with means including a shiftable indicator for registering the condition to be regulated, of condition-adjusting means, a manometric pressure-device for actuating said latter means, a pressure relief vent for said device, a closure for said vent actuable by said indicator when it reaches a predetermined position, and means whereon said closure is pivotally supported, the closure supporting means and vent adjustable as a unit along the path of the indicator and also being relatively adjustable, so that said closure may close the orifice of said vent, to the desired extent, the least adjustment being permanent at all adjustments of said unit.

19. In a regulating mechanism, the combination with means including a shiftable indicator for registering the condition to be regulated, of condition-adjusting means, a manometric high and low pressure device for actuating said latter means, a low-pressure relief vent for said device, a closure for said vent actuable by said indicator when it reaches a predetermined position, and means whereon said closure is pivotally supported and whereby said closure may be adjusted relatively to said vent, so that said closure may be positioned to effectively close the orifice of said vent, to the desired extent, said supporting means together with said vent being adjustable as a unit relatively to said indicator.

20. In a regulating mechanism, the combination with means including a shiftable indicator for registering the condition to be regulated, of condition-adjusting means, a manometric pressure device for actuating said latter means, a tube, including a pressure-relieving vent for said device, a closure for said vent, said closure operable by said indicator, a rack on said tube, a pinion, and means enabling said rack and pinion to co-operate to shift said tube and closure along the range of indicator movement, so that the degree of condition at which said indicator and closure co-operate may be predetermined.

21. In a regulating mechanism, the combination with means including a shiftable indicator for registering the condition to be regulated, of condition-adjusting means, a manometric pressure device for actuating said latter means, a pressure relief vent for said device, a closure for said vent actuable by said indicator when it reaches a predetermined position, and means applied to said closure to balance the pressure against said closure at said vent and keep it closed until the indicator opens it, said last-mentioned means including a projection on said closure and a weight shiftable along said projection to adjust the position at which said weight overbalances said pressure.

22. In a regulating mechanism, the combination with means including a shiftable indicator for registering the condition to be regulated, of condition-adjusting means, a manometric pressure device for actuating said latter means, a pressure relief vent for said device, a closure for said vent actuable by said indicator when it reaches a predetermined position, and a closure supporting bracket on said tube, said bracket and closure being adjustable along said tube, so that said closure may be positioned to effectively close the orifice of said vent.

GEORGE F. MACHLET.